US00RE45525E

(19) United States
(12) Reissued Patent
Xiao

(10) Patent Number: US RE45,525 E
(45) Date of Reissued Patent: May 19, 2015

(54) APPARATUS AND METHOD OF SIMULATING A SOMATOSENSORY EXPERIENCE IN SPACE

(71) Applicant: Quan Xiao, Santa Clara, CA (US)

(72) Inventor: Quan Xiao, Santa Clara, CA (US)

(73) Assignee: Soarealm, Inc., Menlo Park, CA (US)

(21) Appl. No.: 14/296,807

(22) Filed: Jun. 5, 2014

Related U.S. Patent Documents

Reissue of:
(64) Patent No.: 8,195,084
Issued: Jun. 5, 2012
Appl. No.: 12/199,393
Filed: Aug. 27, 2008

U.S. Applications:
(60) Provisional application No. 60/966,329, filed on Aug. 27, 2007, provisional application No. 61/008,946, filed on Dec. 21, 2007.

(51) Int. Cl.
*A63F 9/24* (2006.01)
*A63F 13/20* (2014.01)

(52) U.S. Cl.
CPC ..... *A63F 13/20* (2014.09)

(58) Field of Classification Search
CPC ..... B64G 7/00
USPC ..... 434/4, 34; 463/31, 42
See application file for complete search history.

(56) References Cited

U.S. PATENT DOCUMENTS 4,464,117 A 8/1984 Foerst ..... 434/67
5,271,106 A 12/1993 McClish et al. ..... 4/494

(Continued)

FOREIGN PATENT DOCUMENTS

JP 728550 10/1995
JP 8182787 7/1996

(Continued)

OTHER PUBLICATIONS

Braden, Jeffrey R., et al, "Development and Testing of a Space Suit Analogue for Neutral Buoyancy EVA Research", *32nd International Conference on Environmental Systems,* SAE Paper 2002-01-2364, [on line] Jul. 2002, XP002519602; retrieved from the internet: url:http://spacecraft.ssl.umd.edu/publications/ICES02-2364.pdf; [retrieved on Mar. 16, 2009] abstract.

(Continued)

*Primary Examiner* — Patricia Engle
(74) *Attorney, Agent, or Firm* — Sunstein Kann Murphy & Timbers LLP

(57) ABSTRACT

A method of providing a user with an extra-terrestrial somatosensory experience includes equipping the user with an underwater breathing apparatus, having the user occupy an underwater environment, such environment providing buoyancy to the user, and while the user occupies the underwater environment, using a computer-implemented virtual reality system to present to the user a virtual reality environment modeling an extra-terrestrial setting. The virtual reality system inhibits visual perception by the user of items outside of the virtual reality environment so that the user experiences the virtual reality environment under a buoyancy condition provided by the underwater environment. The buoyancy condition enhances the experience of the virtual reality environment.

32 Claims, 3 Drawing Sheets

(56) References Cited

U.S. PATENT DOCUMENTS

| | | | | |
|---|---|---|---|---|
| 5,320,538 | A | 6/1994 | Baum | 434/307 |
| 5,420,828 | A | 5/1995 | Geiger | 367/131 |
| 5,684,531 | A * | 11/1997 | Li et al. | 348/139 |
| 5,762,612 | A | 6/1998 | Campbell | 600/558 |
| 5,846,134 | A | 12/1998 | Latypov | 463/46 |
| 6,181,644 | B1 | 1/2001 | Gallagher | 367/131 |
| 6,977,671 | B1 * | 12/2005 | Kitson et al. | 348/81 |
| 7,046,440 | B1 | 5/2006 | Kaehr | 359/464 |
| 7,174,844 | B2 | 2/2007 | Hebert et al. | 114/312 |
| 2004/0086838 | A1 | 5/2004 | Dinis | 434/247 |
| 2010/0240454 | A1 * | 9/2010 | Xiao | 463/30 |

FOREIGN PATENT DOCUMENTS

| | | |
|---|---|---|
| JP | 2002220100 | 8/2002 |
| WO | WO 2008/055974 A1 | 5/2008 |

OTHER PUBLICATIONS

International Searching Authority, "International Search Report and Written Opinion", dated Jan. 4, 2009, PCT/US2008/074447.

* cited by examiner

APPARATUS AND METHOD OF SIMULATING A SOMATOSENSORY EXPERIENCE IN SPACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application claims priority from U.S. Provisional [Patents] Application Ser. Nos. [60/966,239] *60/966, 329* and 61/008,946 filed Aug. 27, 2007 and Dec. 21, 2007 respectively, the full disclosures of which are hereby incorporated by reference herein.

TECHNICAL FIELD

The present invention relates to simulating experiences underwater, and more particularly to using underwater systems to simulate an extra-terrestrial experience.

BACKGROUND ART

It is known in the prior art to provide users with virtual reality systems. The ability for these systems has increased and they are providing greater image quality, lower prices, and enhanced abilities to integrate real world materials with the virtual reality materials to provide a more realistic experience. Presently, virtual reality systems focus on engaging the visual and audio senses of a user.

Neutral buoyancy underwater training is also a known technique that is employed for its ability to provide microgravity environment training on earth. Such training systems are used in connection with underwater laboratories for training astronauts.

As demonstrated by U.S. Pat. No. 5,271,106 and U.S. Patent Application Publication No. 2004/0086838 there are also known techniques for simulating underwater experiences in an underwater environment.

SUMMARY OF THE INVENTION

A first embodiment of the invention is directed to a method of providing a user with an extra-terrestrial somatosensory experience. The method in this embodiment includes equipping the user with an underwater breathing apparatus, having the user occupy an underwater environment, such environment providing buoyancy to the user, and while the user occupies the underwater environment, using a computer-implemented virtual reality system to present to the user a virtual reality environment modeling an extra-terrestrial setting. The virtual reality system inhibits visual perception by the user of items outside of the virtual reality environment so that the user experiences the virtual reality environment under a buoyancy condition provided by the underwater environment, such buoyancy condition enhancing the experience of the virtual reality environment.

In a related embodiment the computer-implemented virtual reality system includes a virtual reality display on at least one surface in the underwater environment.

In a further related embodiment the surface is at least one wall of the underwater environment.

In another related embodiment using the computer-implemented virtual reality system includes having the user don (i) a head-mounted display system, such display system including at least one sensor to identify at least one position of the user's head, wherein the display system and the sensors form a part of the computer-implemented virtual reality system.

In yet another related embodiment using a computer-implemented virtual reality system includes having the user don (i) a head-mounted display system, such display system including at least one motion-tracking sensor for tracking the user's head movement, wherein the display system and the sensors form a part of the computer-implemented virtual reality system.

In another related embodiment using a computer-implemented virtual reality system includes using the virtual reality system to model an experience in space.

In another related embodiment the user's buoyancy in the underwater environment is adjusted to a desired level.

In another related embodiment a position associated with the user is monitored and the virtual reality environment is adjusted in a manner responsive to the position.

In a related embodiment the method includes blocking a light source transmitting light into the underwater environment.

In a further related embodiment the method includes using floating light absorbing materials positioned on an upper surface of the underwater environment to block a light source.

In another embodiment, the present invention is directed to a method of providing a user with a somatosensory experience simulating that of a person in space. The method includes having the user don (i) a head-mounted display system, such display system including at least one sensor to identify at least one of position and motion of the user's head, and (ii) underwater breathing apparatus, having the user occupy an underwater environment, such environment providing buoyancy to the user and supplying a virtual reality video input to the head-mounted display system while the user occupies the underwater environment. The video input is dynamically modified in accordance with at least one of position or motion of the user's head as determined by the at least one sensor so that the user experiences virtual reality video through the head-mounted display under a buoyancy condition provided by the underwater environment. The buoyancy condition enhances experience of the virtual reality environment.

In a related embodiment the user's buoyancy is adjusted.

In a further related embodiment the underwater breathing apparatus adjusts the user's buoyancy.

In another related embodiment the user's buoyancy is adjusted by increasing or decreasing a fluid level in a buoyancy control mechanism worn by the user.

Another embodiment of the present invention is directed to a virtual reality apparatus that provides a user with an extra-terrestrial somatosensory experience. The apparatus includes an underwater environment in which the user may be immersed and a computer-implemented virtual reality system that presents to the user a virtual reality environment within the underwater environment, the virtual reality environment modeling an extra-terrestrial setting, and inhibiting visual perception by the user of items outside of the virtual reality environment.

In a related embodiment the computer implemented virtual reality system includes a head-mounted display system, such display system including at least one sensor to identify at least one of position and motion of the user's head, wherein the display system and the sensor form a part of the computer-implemented virtual reality system, the head-mounted display system integrated with an underwater breathing apparatus for use by the user, operative in the underwater environment.

In another related embodiment the computer implemented virtual reality system includes an external display in the underwater environment providing a visual display of the virtual reality environment.

In yet another related embodiment the apparatus includes an underwater breathing apparatus.

In a further related embodiment the underwater breathing apparatus is at least one of a closed circuit breathing apparatus and a surface air supply system that vents the user's exhaust air to the surface.

In another related embodiment the apparatus includes an ocular interface having a color filtration system therein.

In yet another related embodiment the underwater environment includes at least one mirror, the mirror positioned to project the visual display of the virtual reality environment on at least one surface of the underwater environment.

In another related embodiment the underwater environment includes a surrounding accommodating visual environment that shrouds, from the user's perception, items outside of the virtual reality environment.

In a further related embodiment the surrounding accommodating visual environment includes a system of black non-reflective surfaces.

In another related embodiment the apparatus includes a buoyancy control mechanism that controls a buoyancy state of the user.

In a further related embodiment the buoyancy control mechanism is a buoyancy jacket having adjustable fluid pockets therein.

In another related embodiment the apparatus includes an audio component for transmitting an audible signal to the user.

In another related embodiment the apparatus includes a tactile component for transmitting a tactile signal to the user.

In a further related embodiment the tactile component is an underwater tool having an electronic interface with the computer-implemented virtual reality system.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
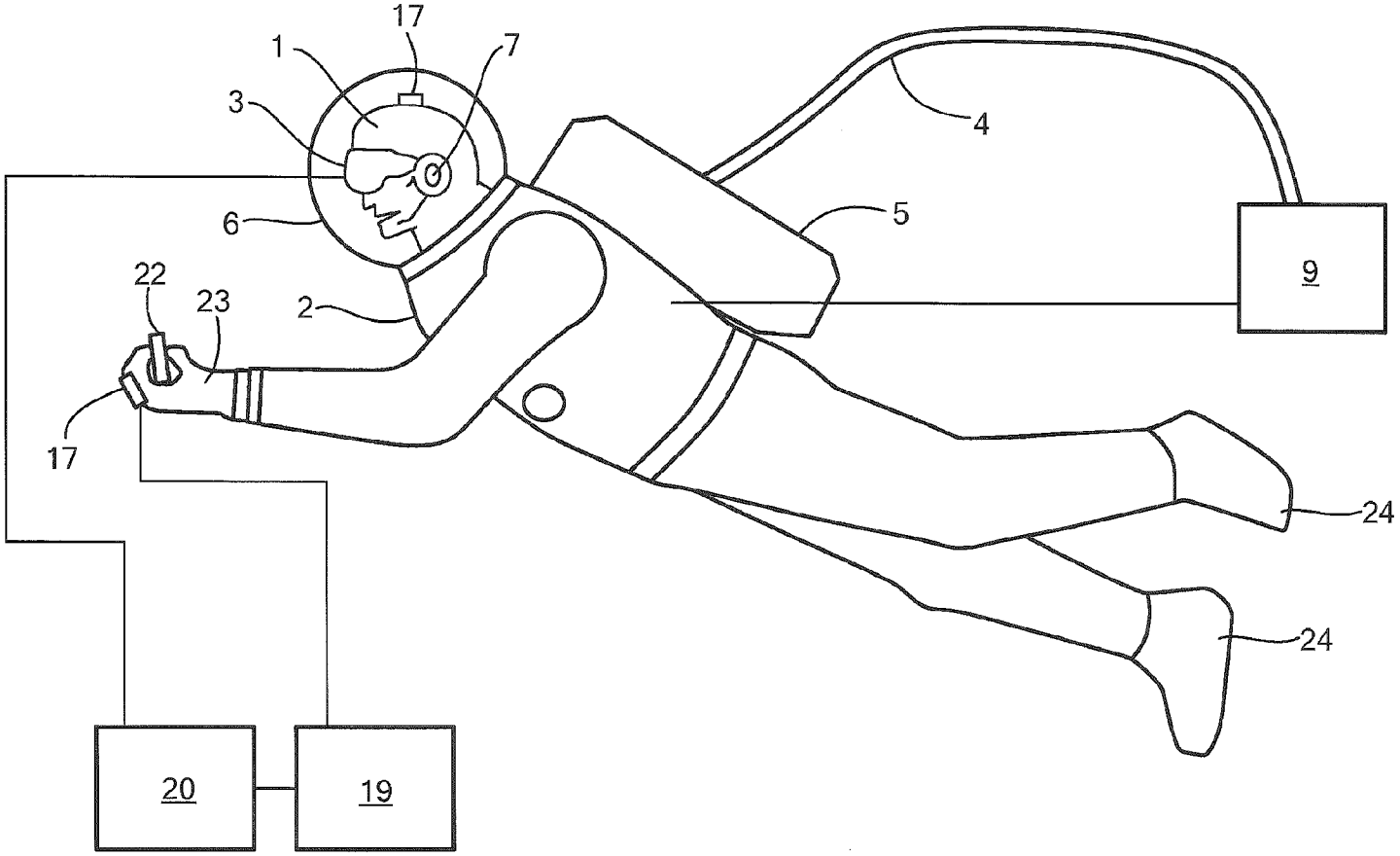
FIG. 1 shows a user in an underwater environment where the user is equipped with an underwater breathing apparatus and a head mounted virtual reality display system in accordance with an embodiment of the present invention.

Definitions. As used in this description and the accompanying claims, the following terms shall have the meanings indicated, unless the context otherwise requires:

"Somatosensory experience" of a user is experience by the user as perceived through the user's sensory organs and other sensory receptors throughout the user's body.

A "virtual reality system" is a computer-based system that presents to the user a virtual reality environment. The virtual reality environment is presented under conditions wherein the user is inhibited from experiencing visual perceptions that are deemed inconsistent with the virtual reality environment. In particular, the virtual reality environment inhibits visual perception by the user of items outside of this environment, by for example presenting visual experience of the environment via a head mounted display that blocks viewing the ambient environment. Alternatively, the visual experience may be presented on one or more displays mounted on one or more surfaces at a distance from the user, under conditions where viewing the ambient environment is inhibited by shrouding anything that may be viewed in a location away from the displays in a sea of blackness, using, for example, black walls that are non-reflective. Often the virtual reality environment models a setting with respect to which a user is able to interact so that user input modifies the presentation of the setting to the user. The interaction may be provided in various forms such as via sensing head motion, user orientation, or via a game controller or sensing gesture of the user.

An "extra-terrestrial" setting modeled in a virtual reality environment is a setting other than one based on earth, and such setting may be fictional. (The gravitational force experienced by a user in many extra-terrestrial environments will generally be less than the gravitational force the user feels on earth's surface.) A setting in space is "extra-terrestrial" for purposes of this definition. A setting inside the earth is also "extra-terrestrial" for purposes of this definition. On the other hand, a setting in an underwater environment on earth is not "extra-terrestrial" for purposes of this definition.

An "extra-terrestrial" somatosensory experience of a user is a somatosensory experience other than one resulting from earth-based physical activity of the user. A somatosensory experience of the user in space is "extra-terrestrial" for purposes of this definition. On the other hand, a somatosensory experience of the user in an underwater environment on earth is not "extra-terrestrial" for purposes of this definition.

Various embodiments of the present invention for simulating somatosensory experiences under water may be used for activities such as training, recreational or entertainment activities, or for therapeutic benefits. Such methods generally require providing a life support system such as an underwater breathing apparatus and a system for producing relevant imagery to a user in three-dimensional format. Embodiments of the invention provided herein generally allow provision of buoyancy conditions in an underwater environment that enhance the experience of the virtual environment. The buoyancy condition or state of the user relates to the net force exerted on the user both by water surrounding the user in the underwater environment (normally providing an upward force) and by gravity (which the upward force of the water counteracts). The buoyancy condition of the user may be modified by equipping the user with the additional objects, such as weights; in considering the buoyancy condition we include the effect of such additional objects. The net force associated with the buoyancy condition may be, but is not required to be, zero. The user may exhibit a buoyancy condition through various of the systems and methods provided herein that simulates a gravitational condition (such as zero gravity or low gravity) that is less than the gravitational force normally experienced on the earth's surface. Thus by, adjusting the buoyancy condition of a user, the user experiences forces that emulate the gravitational forces one would feel if the user were actually in the simulated environment thereby enhancing the experience. As will be described with reference to the embodiments illustrated such methods and systems may consist of a variety of components.

In accordance with an embodiment of the present invention depicted in FIG. 1, a user is provided with an underwater breathing apparatus in combination with head mounted display 3. The head mounted display 3 may be in the form of goggles. The head mounted display is used to provide the user with a virtual reality experience. The head mounted display provides the user with three-dimensional visual imagery and other content that stimulates different senses in the somatosensory system. The content provided by the virtual reality system generally simulates an extraterrestrial experience using an underwater environment such as a pool.

The underwater breathing apparatus may be a self-contained breathing apparatus having an air storage device, such as pressurized gas cylinders, located in backpack 5 or the underwater breathing apparatus may include a remote air supply where an umbilical cord, such as cord 4, connects the user to an air supply system. The air supply system may be either underwater such as system 9 in FIG. 1 or a surface supplied system that is above water (i.e. the supply is not submerged, but is on, outside, or above the surface of the water). Since the operation depth for typical activity is less than 35 feet, a very wide range of underwater breathing apparatuses may be implemented. The underwater breathing system may be an open circuit system, wherein the exhaled air exits to the water or a closed circuit system where the exhaled air is processed for re-use as will be discussed further.

The backpack 5 of the user may be used to carry other communication or data transmission systems as an alternative or in addition to housing a portion of the underwater breathing apparatus.

In some embodiments the user may be provided with a back up air supply such as an air pipe or other system for increased safety precautions.

The head mounted display apparatus 3 depicted in FIG. 1 includes a visual display for providing three dimensional or stereoscopic images. Such a system can be provided in a small and lightweight format that will easily fit into a helmet such as helmet 6. The images displayed may be animated to move in a predetermined or random manner. A computer system 20 may be provided for storing the three-dimensional graphics. The computer system(s) may also control the acceleration of the three-dimensional graphics.

A head mounted display 3 for displaying the virtual space to the user 1 is connected to system 20. The head mounted display apparatus 3 may also include headphones 7 or an alternative audio system for transmitting sound to the user. The head mounted display 3 may also be equipped with sensors, such as accelerometers or angular rate sensors, or other inertial tracking systems to detect specified motions of the user so that proper adjustments to the virtual environment being displayed may be provided. Other sensors, such as sensor 17 or other sensors on other parts of the user or the user's extremities, for detecting user feedback, position, orientation, or responses may transmit data about the user's interaction in real space (the underwater environment) to system 19 for further processing. The transmitted data may include information about the user's head motion or other body motion as well as other body conditions (temperature, relative location, etc). This data may be transmitted via a physical electrical connection designed for underwater use or it may be wirelessly transmitted. System 19, which may be located in the underwater environment or outside of the environment, calculates the user's conditions and responses to provide commands to system 20 that cause the virtual environment to be adjusted. System 20 may also be remotely located with respect to the user in the underwater environment or outside of the environment.

In some embodiments the head mounted display may be controlled by an onsite system located with the user. For example the control system may be in the user's helmet 6, in the user's backpack 5, or in other suitable locations in the user's underwater equipment. Accordingly, the user may be completely free of any tethers or links in some embodiments.

The user 1 will generally be wearing an underwater dry suit 2, which may include additional components that help simulate the virtual environment and experience and which may be styled like a space suite. The underwater dry suit 2 may be integral with or capable of integrating with helmet 6, gloves 23, and boots 24. Suit 2, helmet 6, gloves 23, and boots 24, may each be equipped with sensors for detecting relative positions of the body, head, hands, or feet, as well as acceleration or other characteristics such as temperature of the same. The suit 2 will provide the expected characteristics of a traditional dry suit, keeping the user dry, but may also be equipped with additional features required to enhance the reality of the virtual environment. By way of example, such features may include, but are not limited to, adjustable temperature elements, systems for inducing motion or exerting a force on the user, or passages for air flow. The suit may include adjustable buoyancy systems for maintaining or altering the buoyancy or position of the user. Additionally, the underwater breathing apparatus may be an integral part of the suit and the suits buoyancy may be adjusted such that the underwater breathing apparatus is virtually unnoticeable to the user.

Helmet 6 will generally be provided with a transparent portion that may be made of glass, plastic or another synthetic material that provides the appropriate strength to withstand appropriate water pressure and impacts. As indicated the helmet should be integrated with the user's suit in such a way that creates a water tight seal.

The suit 2 may also be provided with water, oxygen, and or CO2 sensors so that leaks may be detected and the appropriate safety measures may be timely implemented.

In general buoyancy adjustments will be made through the user's suit or other equipment provided to the user (user's backpack, etc) to maintain the user at the desired buoyancy state, for example a neutral buoyancy state for simulation of a zero gravity environment. By way of example the inner side layers of the user's dry suit or other outer suit may include multiple independently adjustable air pockets or foam pads to provide the user with a more realistic feeling of weightlessness. Other forms of buoyancy control mechanisms may be provided in order to alter the cumulative differential forces experienced by the user. Adjustments may be made to the user's buoyancy by adjusting the buoyancy control mechanism provided to the user. The adjustments may include increasing or decreasing fluid levels of the buoyancy control mechanism. Furthermore, the buoyancy control mechanism may be operable through manual adjustments made by an operator from a remote location. The control mechanism may also be adjusted automatically in accordance with the virtual environment either remotely or through a system onsite with the user. For example, when the user is provided with a head mounted display that is controlled onsite through a system located with the user, the system may be also be capable of controlling the buoyancy control mechanism in accordance with the virtual environment being experienced by the user.

In addition to the zero-gravity adjustable buoyancy systems within the suit, the suit may also include an inflatable emergency system capable of quickly returning the user to the surface.

The electronic systems provided in backpack 5 can connect the user to a remote system on the surface or away from the user through chord 4. Accordingly, chord 4 may serve multiple purposes of linking the user with an air supply as aforementioned and/or linking the user with other remote electronic systems.

The head mounted display 3 may in some embodiments be capable of remote adjustments. For example, the head mounted display may be actuated by the user or by a remote operator to be cleared from the user's line of sight. Clearing the display from the user's line of sight may be achieved through an electro-mechanical linkage that causes the head mounted display to rotate upward. This type of actuation allows a user to have an unobstructed view when the simulation has ended or is paused without the need to remove the helmet 6 or complete some other complex physical feat to access their face.

The user 1 may be provided with a hand controller 22 to control the display, to access their communication systems, or control any other feature in the event that the user is training or participating in a game.

Figure 2:
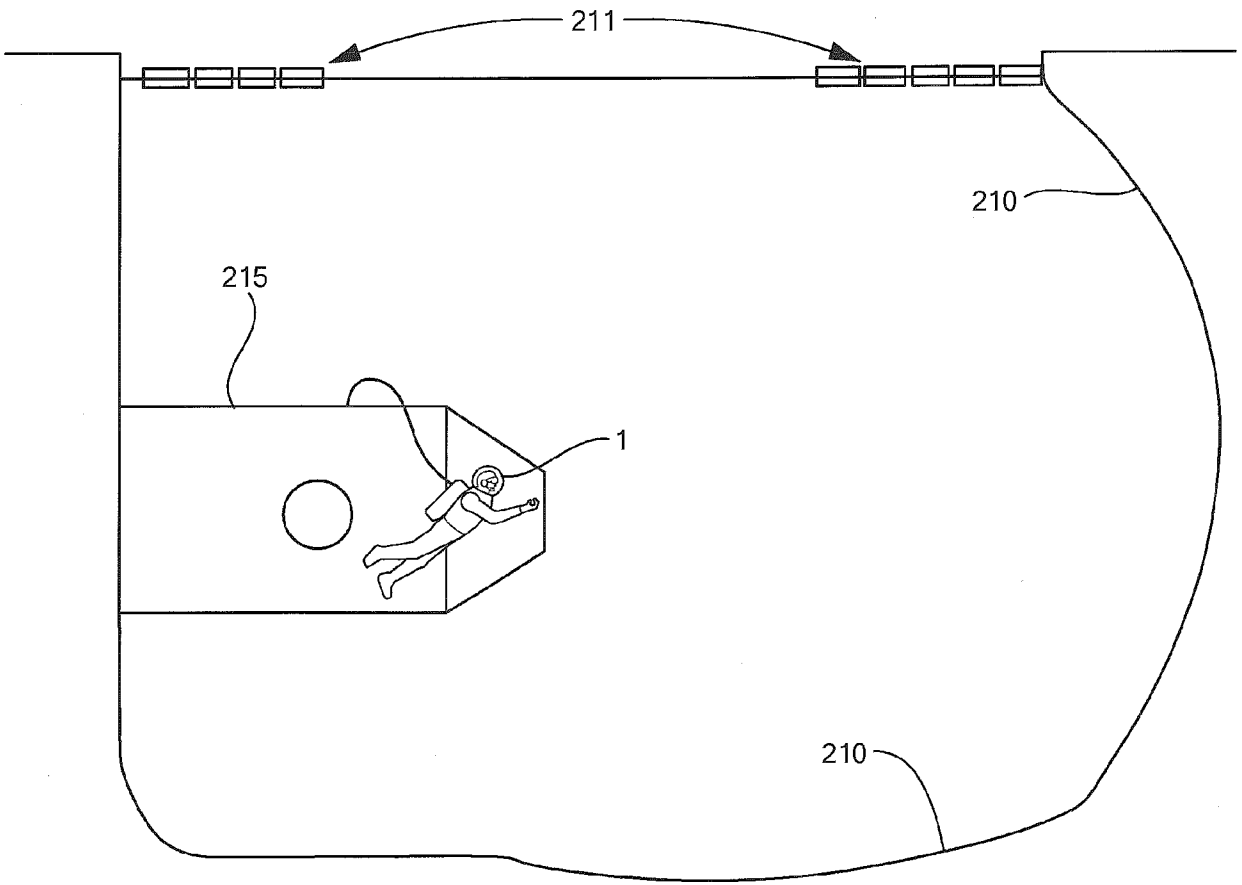
FIG. 2 shows a user in an underwater environment where the user is equipped with an underwater breathing apparatus and an external display is provided in the underwater environment in accordance with an embodiment of the present invention.

In some embodiments the head mounted display 3 may be provided with a camera so that the user can view objects in their surrounding such as the space shuttle simulator 215 illustrated in FIG. 2. In those embodiments a computer system such as system 20 can switch or alter the view of user 1 in the head mounted display 3 such that the user can obtain the appropriate sensations that simulates user 1 physically working on or with systems physically in his or her environment while maintaining the sensation of being in the virtual environment.

In other embodiments the user may have equipment and systems similar to those depicted in FIG. 1 with the exception of the head mounted display. As demonstrated in FIG. 2 as an alternative to the head mounted display user 1 may be provided with an external display 210, which may include one or more screens. The external display may include any display that is directly or indirectly viewable from the underwater environment, which is not provided by the head mounted display. The embodiment illustrated in FIG. 2 utilizes an external display screen that is submersible. Alternatively, the display may be provided on a screen that is viewable through a transparent wall of the pool. The images provided on the external screen may be three-dimensional images. The images may be made displayed in a three dimensional format through the use of polarization techniques wherein two images are projected with orthogonal polarization and the user is equipped with polaroid glasses whose polarization axes are arranged at right angles to one another. Alternatively, a three-dimensional effect may be provided by the user 1 viewing temporally separated images through eyeglasses connected to a video system. Other methods of providing the user with a three-dimensional or stereoscopic view when using either an external or head mounted display may be provided.

In our definition of "virtual reality system" above, we said that the virtual reality environment inhibits visual perception by the user of items outside of this environment. A head-mounted display in accordance with FIG. 1 will inhibit visual perception by the user of items outside of the virtual reality environment by blocking viewing of the ambient environment. However, an external display, such as illustrated in FIG. 2, does not inherently limit the user's field of vision. Consequently it is necessary to use in conjunction with the external display, other means of inhibiting visual perception by the user of items outside of this environment.

In order to promote the immersion of an underwater user into a virtual environment, it is important to consider both the image signal that the user can see and the surrounding environment visible to the user. We have said that in a virtual reality system the user is inhibited from experiencing visual perceptions that are deemed inconsistent with the virtual reality environment. Accordingly, the surrounding environment perceivable by the user should be integrated with the images displayed and should not provide visual references that are inconsistent with the display. The image displayed to the user may not always occupy the user's field of view; thus, other visual references, such as edges of the pool, outside light sources, reflections from the surface of water, or even the bubbles of the user's exhalation, which might distract the user or cause the virtual environment to feel less genuine, should be suitably camouflaged, hidden, or integrated in a manner depriving the user of a reference to the conventional underwater environment. For example, if the user is able to see these visual references, that perception might increase the user's feeling of being in a pool or underwater environment, so as to interfere with the user's experience of being immersed within a virtual environment. Accordingly, those visual references conflicting with the user's experience of the "immersive extra terrestrial environment" are inhibited.

Thus, the lights from these visual references should be controlled, or more precisely absorbed and/or blocked significantly, from entering user's eyes and the user's ability to see such reference cues should be shrouded. There are various ways that these goals might be achieved. For example a light source might be controlled, absorbed or blocked at or very close to the light source. This might be achieved by building an indoor environment so that illumination to the pool from outside light sources can be controlled. Additionally, the pool surfaces not participating in the image signal display may be treated with light absorbing materials so that a user may not perceive surfaces, edges, etc. Another way of controlling distracting visual references such as light includes blocking the light transmission path between the source and the underwater environment. For example to resolve the reflection from the water to air surface, floating light absorbing materials can be placed on the surface of the water so that the incoming and outgoing reflections from the water to air surface can be absorbed. Yet another way of controlling the distracting visual references includes absorbing or blocking light near the eyes of the user. For example, the user may be equipped with a head mounted display having an eyecup that blocks almost all lights the user can see, thereby allowing the user to focus on the image provided in the head mounted display.

Through control of a visual reference, either at the source or in between the source and the user, embodiments of the invention that do not include a head mounted display are able to provide the user with a surround accommodating visual environment ("SAVE").

Virtual reality is limited when the only visual stimulation is provided or displayed to a user. The human body uses three different senses to resolve motion and acceleration cues like those simulated in virtual reality. Visual stimulation is adequate to perceive the motion of an external object such as a bouncing ball, but is insufficient to fully demonstrate selfmotion. Reliance on purely the visual scene, therefore, necessarily invites conflict between the visual system and the two remaining centers for motion sensation that remain dormant and, therefore, does not reinforce the visual sensations. Accordingly, notwithstanding provision of a SAVE, the user still may not feel completely immersed in an extra terrestrial environment without engagement of additional non-visual senses such as touch to resolve force or acceleration. Organizations such as NASA have engaged in the use of water submersion for simulation of low gravity conditions by their astronauts. When the force feelings provided by an underwater life support system which includes breathing means and buoyancy control means, are confirmed by the surrounding visual cues provided by the SAVE, the immersive sensation of the extraterrestrial environment may be achieved. Accordingly, some embodiments of the invention provide simulations that will engage the user's tactile and hearing sense in a manner consistent with the visual display and surrounding visual cues provided by the SAVE.

In some embodiments the external display may be provided in such a format that surrounds the user so that the user feels as though he or she is in the environment being simulated. To achieve this sensation the external screen may be displayed on the sidewalls and the bottom surface of the pool and or the pool may have a spherical shape, with no apparent edges in the user's field of view. The underwater environment may be structured to provide a display as in a cave automatic virtual environment, also known as "CAVE", wherein the visual display is provided on multiple walls of the underwater environment so that the user is surrounded by the virtual environment and has a more realistic sensation of being immersed in the environment depicted by the virtual environment.

As we discuss above, it is important to inhibit visual perception by the user of items outside of the virtual reality environment. FIG. 2 thus illustrates other objects that may be used in this connection when an external display is provided. These objects may include a space shuttle simulator 215 and light-absorbing foam blocks 211 floating on the surface of the water environment to prevent ambient light from entering the user's field of view and otherwise distract the user's visual experience of the virtual reality environment. Other objects may be provided in related embodiments in order to enable and enhance the realism of the virtual environment or experience, such as underwater tools useful in training exercises. Objects, such as the tools, may also be adjustable to a state of neutral buoyancy and may have an electrical interface with the virtual environment such that the user's interaction with the tool is depicted in the virtual environment. Additionally, the inner surface of the pool may be decorated to increase the reality of the virtual environment. For example the non-display portions of the pool surface may be painted with light absorbing materials.

Objects such as the light absorbing blocks may also be painted black. Theses blocks may be positioned in specific locations to block external light sources from penetrating into the underwater environment. The blocks will also help prevent the visually displayed virtual environment being displayed in the underwater environment from being reflected onto an upper surface of the underwater environment. Other mechanisms may be used to inhibit visual perception by the user of items outside of the virtual reality environment, including, but not limited to providing a controlled indoor environment with adaptive and adjustable lighting systems.

Figure 3:
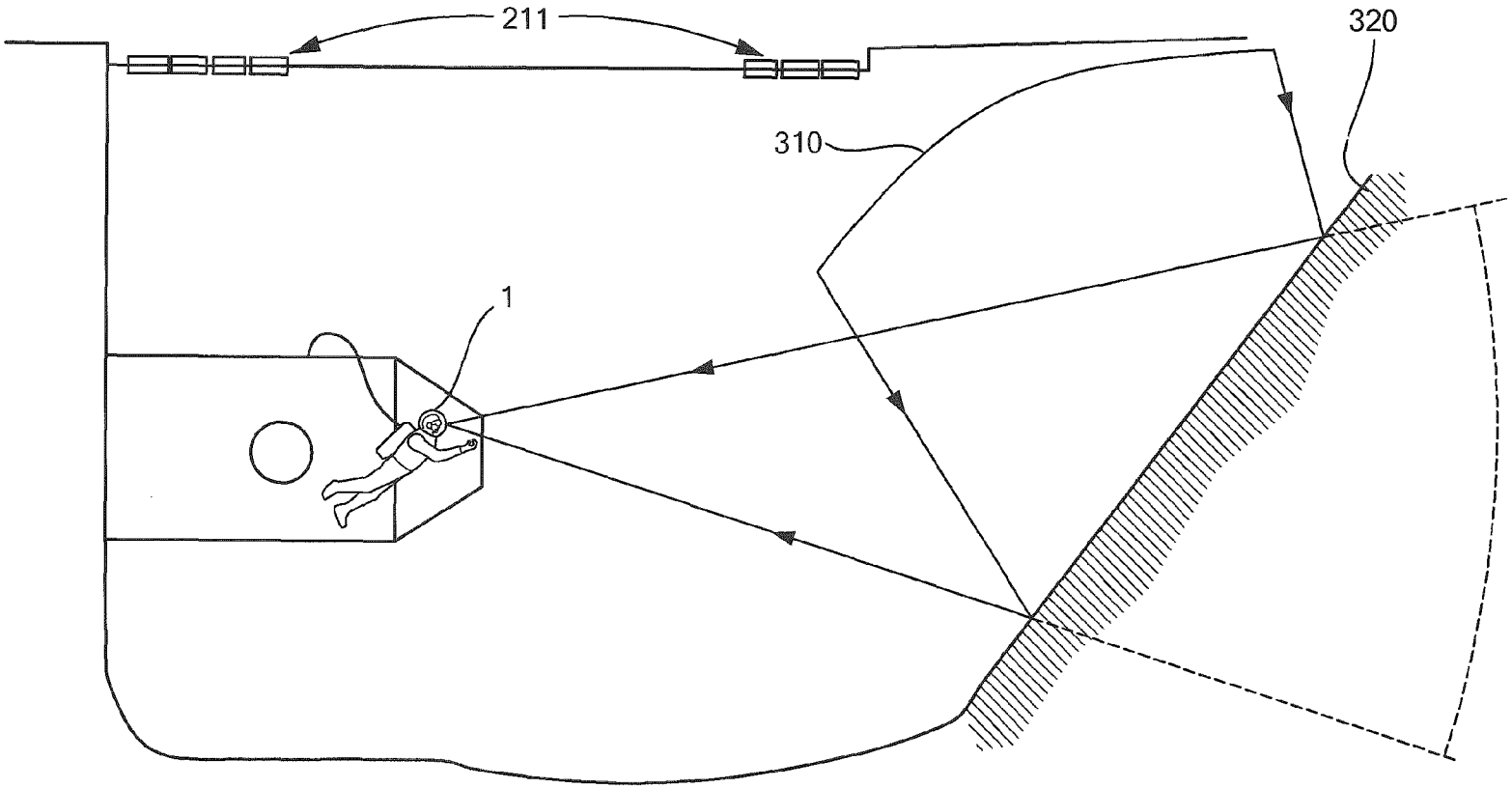
FIG. 3 shows a user in an underwater environment where the user is equipped with an underwater breathing apparatus and the user is viewing an external display provided by at least one mirror in the underwater environment reflecting a display into the user's field of view in accordance with an embodiment of the present invention.

FIG. 3 shows another embodiment that demonstrates the use of an external display as opposed to a head mounted display. In FIG. 3 mirror 320 is used to project the images provided on display 310 into the field of view of user 1. A mirror may be placed in the water in such a manner that the user is unable to see his or her reflection, but rather sees a visual display of the virtual environment reflected in the mirror.

In the embodiment where an external display is provided the user will need to see through the water to have a view of the display. As such the user may be provided with a color filter system integrated into the user's helmet, goggles, or other form of ocular interface to compensate for the un-even transparency of water in the visible spectrum range. Alternatively, the external display may be adjusted or electronically filtered to compensate for the light absorption by water. This will generally require strengthening the red-end of illustrated spectrum according to the absorption curve and distance so the user sees an image that is white-balanced.

In some of the disclosed embodiments the choice of underwater breathing apparatus may be dictated by the display system being utilized. For example, in the event that the user is using a system having an external display, a self-contained breathing apparatus with a closed circuit system may be more advantageous as such a system would essentially eliminate bubbles, thereby providing the user with a more realistic experience. If the user is using a system with a surface supplied air system and an external display, the user's exhaust air may still be vented to the surface to eliminate bubbles being produced in the user's field of view.

Alternatively, in the case where a user is supplied with a head-mounted display, bubbles may be less of a concern and the user may be provided with a breathing apparatus that vents directly into the water (i.e. an open circuit breathing system).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of providing a user with an extra-terrestrial somatosensory experience, the method comprising:

equipping the user with an underwater breathing apparatus;

having the user occupy an underwater environment, such environment providing buoyancy to the user; and while the user occupies the underwater environment, using a computer-implemented virtual reality system to present to the user a virtual reality environment modeling an extra-terrestrial setting, the virtual reality system inhibiting visual perception by the user of items outside of the virtual reality environment, wherein using a computer-implemented virtual reality system includes having the user don a head-mounted display system, such display system including at least one sensor to identify at least one position of the user's head, wherein the display system and the sensors form a part of the computer-implemented virtual reality system;

so that the user experiences the virtual reality environment under a buoyancy condition provided by the underwater environment, such buoyancy condition enhancing experience of the virtual reality environment.

2. A method according to claim 1, wherein using a computer-implemented virtual reality system includes using the virtual reality system to model an experience in space.

3. A method according to claim 1, wherein the head-mounted display system includes a camera to provide a source of real-world images, and wherein the computer-implemented virtual reality system selectively displays the real-world images or mixes the real-world images with virtual images for the virtual reality environment presented to the user.

4. A method of providing a user with an extra-terrestrial somatosensory experience, the method comprising:

equipping the user with an underwater breathing apparatus;

having the user occupy an underwater environment, such environment providing buoyancy to the user; and while the user occupies the underwater environment, using a computer-implemented virtual reality system to present to the user a virtual reality environment modeling an extra-terrestrial setting, the virtual reality system inhibiting visual perception by the user of items outside of the virtual reality environment, wherein using a computer-implemented virtual reality system includes having the user don a head-mounted display system, such display system including at least one motion tracking sensor for tracking the user's head movement, wherein the display system and the sensors form a part of the computer-implemented virtual reality system;

so that the user experiences the virtual reality environment under a buoyancy condition provided by the underwater environment, such buoyancy condition enhancing experience of the virtual reality environment.

5. A method according to claim 4, further comprising:

adjusting buoyancy of the user in the underwater environment to a desired level.

6. A method according to claim 4, further comprising:

monitoring a position associated with the user and adjusting the virtual reality environment in a manner responsive to the position.

7. A method according to claim 4, wherein the head-mounted display system includes a camera to provide a source of real-world images, and wherein the computer-implemented virtual reality system selectively displays the real-world images or mixes the real-world images with virtual images for the virtual reality environment presented to the user.

8. A method of providing a user with an extra-terrestrial somatosensory experience, the method comprising:

equipping the user with an underwater breathing apparatus;

having the user occupy an underwater environment, such environment providing buoyancy to the user;

while the user occupies the underwater environment, using a computer-implemented virtual reality system to present to the user a virtual reality environment modeling an extra-terrestrial setting, wherein using a computer-implemented virtual reality system includes providing a virtual reality display on at least one surface in the underwater environment, the virtual reality system inhibiting visual perception by the user of items outside of the virtual reality environment; and using floating light absorbing materials positioned on an upper surface of the underwater environment to block or substantially reduce light from outside of the underwater environment from entering the underwater environment or light from inside the underwater environment from being reflected on the upper surface;

so that the user experiences the virtual reality environment under a buoyancy condition provided by the underwater environment, such buoyancy condition enhancing experience of the virtual reality environment.

9. A method according to claim 8, further comprising:

adjusting buoyancy of the user in the underwater environment to a desired level.

10. A method according to claim 8, further comprising:

monitoring a position associated with the user and adjusting the virtual reality environment in a manner responsive to the position.

11. A method of providing a user with a somatosensory experience simulating that of a person in space, the method comprising:

having the user don (i) a head-mounted display system, such display system including at least one sensor to identify at least one of position [and] *or* motion of the user's head, and (ii) underwater breathing apparatus;

having the user occupy an underwater environment, such environment providing buoyancy to the user; and while the user occupies the underwater environment, supplying a virtual reality video input to the head-mounted display system, such video input being dynamically modified in accordance with at least one of position or motion of the user's head as determined by the at least one sensor; so that the user experiences virtual reality video through the head-mounted display under a buoyancy condition provided by the underwater environment, such buoyancy condition enhancing experience of the virtual reality environment.

12. A method according to claim 11, further comprising:

adjusting the user's buoyancy.

13. A method according to claim 12, wherein the underwater breathing apparatus adjusts the user's buoyancy.

14. A method according to claim 11, wherein the user's buoyancy is adjusted by increasing or decreasing a fluid level in a buoyancy control mechanism worn by the user.

15. A method according to claim 11, further comprising:

remotely adjusting the head mounted display system including clearing at least a portion of the display from the user's line of sight.

16. A method according to claim 15, wherein the remote adjustments are actuated by the user or by a remote operator.

17. A method according to claim 11, wherein the head-mounted display system includes a camera to provide a source of real-world images, and wherein the virtual reality video input to the head-mounted display system selectively includes the real-world images or a mixture of the real-world images with virtual images.

18. A virtual reality apparatus for providing a user with an extra-terrestrial somatosensory experience, the apparatus comprising:

an underwater environment in which the user may be immersed wherein the underwater environment includes floating light absorbing materials positioned on an upper surface of the underwater environment to block or substantially reduce light from outside of the underwater environment from entering the underwater environment or light from inside the underwater environment from being reflected on the upper surface; and a computer-implemented virtual reality system that presents to the user a virtual reality environment within the underwater environment, the virtual reality environment modeling an extra-terrestrial setting, and inhibiting visual perception by the user of items outside of the virtual reality environment, wherein the computer-implemented virtual reality system includes an external display in the underwater environment providing a visual display of the virtual reality environment.

19. An apparatus according to claim 18, further comprising:

an underwater breathing apparatus.

20. An apparatus according to claim 19, wherein the underwater breathing apparatus is at least one of a closed circuit breathing apparatus and a surface air supply system that vents the user's exhaust air to the surface.

21. An apparatus according to claim 18, further comprising:

a color filtration system for white balancing the visual display of the virtual reality environment.

22. An apparatus according to claim 18 wherein the underwater environment includes at least one mirror, the mirror positioned to project the visual display of the virtual reality environment on at least one surface of the underwater environment.

23. A virtual reality apparatus for providing a user with an extra-terrestrial somatosensory experience, the apparatus comprising:

an underwater environment in which the user may be immersed; and a computer-implemented virtual reality system that presents to the user a virtual reality environment within the underwater environment, the virtual reality environment modeling an extra-terrestrial setting, and inhibiting visual perception by the user of items outside of the virtual reality environment, wherein the computer implemented virtual reality system includes:

a head-mounted display system, such display system including at least one sensor to identify at least one of position [and] *or* motion of the user's head, wherein the display system and the sensor form a part of the computer-implemented virtual reality system, the head-mounted display system integrated with an underwater breathing apparatus for use by the user, operative in the underwater environment.

24. An apparatus according to claim 23, further comprising:

a buoyancy control mechanism that controls a buoyancy state of the user.

25. An apparatus according to claim 24 wherein the buoyancy control mechanism is a buoyancy jacket having adjustable fluid pockets therein.

26. An apparatus according to claim 23, further comprising:

an audio component for transmitting an audible signal to the user.

27. An apparatus according to claim 23, further comprising a tactile component for transmitting a tactile signal to the user.

28. An apparatus according to claim 27, wherein the tactile component is an underwater tool having an electronic interface with the computer-implemented virtual reality system.

29. An apparatus according to claim 23, wherein the head mounted display system is capable of remote adjustments including clearing at least a portion of the display from the user's line of sight.

30. An apparatus according to claim 29, wherein the head mounted display includes an electro-mechanical linkage capable of causing the head mounted display to rotate upward.

31. An apparatus according to claim 29, wherein the remote adjustments are capable of being actuated by the user or by a remote operator.

32. An apparatus according to claim 23, wherein the head-mounted display system includes a camera to provide a source of real-world images, and wherein the computer-implemented virtual reality system selectively displays the real-world images or mixes the real-world images with virtual images for the virtual reality environment presented to the user.

* * * * *